United States Patent
Inlow (10) Patent No.: US 8,781,530 B2
(45) Date of Patent: Jul. 15, 2014

(54) OTA FILE UPLOAD SERVERS

(75) Inventor: Scott Inlow, Lawrenceville, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 779 days.

(21) Appl. No.: 12/336,523

(22) Filed: Dec. 16, 2008

(65) Prior Publication Data

US 2010/0151905 A1 Jun. 17, 2010

(51) Int. Cl.
| | | |
|---|---|---|
| H04B 1/38 | (2006.01) | |
| H04M 11/00 | (2006.01) | |
| H04M 1/66 | (2006.01) | |
| H04M 1/68 | (2006.01) | |
| H04M 3/16 | (2006.01) | |

(52) U.S. Cl.
USPC ............................. 455/558; 455/407; 455/411

(58) Field of Classification Search
USPC .................. 455/558, 572, 407, 411; 715/751
See application file for complete search history.

(56) References Cited

U.S. PATENT DOCUMENTS

| | | | | |
|---|---|---|---|---|
| 5,915,225 | A * | 6/1999 | Mills | 455/558 |
| 6,282,404 | B1 * | 8/2001 | Linton | 434/350 |
| 7,623,852 | B2 * | 11/2009 | Gnuschke | 455/419 |
| 7,640,039 | B2 * | 12/2009 | Kamada | 455/558 |
| 7,715,884 | B2 * | 5/2010 | Book et al. | 455/572 |
| 2005/0108055 | A1 * | 5/2005 | Ott et al. | 705/2 |
| 2007/0214423 | A1 * | 9/2007 | Teplov et al. | 715/751 |
| 2008/0147675 | A1 * | 6/2008 | Engehausen et al. | 707/10 |

* cited by examiner

*Primary Examiner* — Dwayne Bost
*Assistant Examiner* — Larry Sternbane
(74) *Attorney, Agent, or Firm* — Hartman & Citrin LLC (57) ABSTRACT

Devices and methods are disclosed which relate to gathering a plurality of data from a SIM card on a wireless communications device and recording the plurality of data onto a database where the plurality of data can be viewed at a later time. A network device requests a plurality of data from a SIM card on a wireless communications device. An OTA platform receives the request and gathers the plurality of data from the SIM card. The OTA platform, which normally sends the plurality of data back to the network device, sends the plurality of data to a file upload server instead. The file upload server records the plurality of data to a database where it can be viewed by the network device. In certain examples, the file upload server sends a notification to the network device that the plurality of data is ready for viewing. In other variations, the plurality of data can be viewed from any internet portal.

18 Claims, 4 Drawing Sheets

OTA FILE UPLOAD SERVERS

BACKGROUND OF THE INVENTION

1. Field of the Invention

The present invention relates to data retrieval. More specifically, the present invention relates to remotely uploading data from a SIM card onto a database.

2. Background of the Invention

Today many cellular telephones are equipped with a Subscriber Identity Module (SIM) card. SIM cards are necessary for the operation of Global System for Mobile Communications (GSM) devices, a mobile device standard used by over 3 billion people. Each SIM card stores network specific information used to authenticate and identify subscribers on a network. This information includes the Integrated Circuit Card Identification (ICCID), International Mobile Subscriber Identity (IMSI), Authentication Key (Ki), Local Area Identity (LAI), and Operator-Specific Emergency Number. The SIM card also stores other carrier specific data, such as the Short Message Service Center (SMSC) number, Service Provider Name (SPN), Service Dialing Numbers (SDN), Advice-Of-Charge parameters, and Value Added Service (VAS) applications.

Often it is necessary to manage the content of SIM cards. There are many elements on the SIM card that need to be managed which control various aspects related to network access, such as the networks the card can access, the priority of each network, how often they should scan for roaming partners, etc. Unfortunately, managing the content is typically a one way street when it comes to those elements on the SIM card. Service providers typically send elements or updates to these SIM card files and get some kind of response, an acknowledgement that they were received on the device. Until recently, service providers did not have a method to proactively query the content on the SIM cards and see what was happening on the device side. This put service providers at a disadvantage when it came to trouble shooting network access issues. The service providers knew what should be on the card and what they thought was on the card, but didn't know for sure what was on the card. There was no way other than to remove the SIM card from the customer's device and insert it into a SIM card reader connected to a PC and read the contents of that SIM card.

Recently, service providers have somewhat gained a capability to remotely read a SIM card without removing it from the customer's device. The service provider can query the SIM card and ask for specific data elements to be returned, with the data elements returned over the air (OTA). This is referred to as an OTA platform. When the service provider queries the SIM card for an OTA response, the data comes back to a client and the client displays the data.

Currently, a browser-based client supplied by an OTA platform vendor can request a remote read of the SIM card and display the response on the client screen. However, there are currently many limitations to this attempted solution. First, the user must not browse away from the client while the upload request is pending, or the response data is lost. Since the request can take several minutes to be processed, this limitation is a burden on the user. Also, with this attempted solution, the data is not persistent. Once the request is successfully processed and returned to the client, if the user browses away from the screen the data is lost for further evaluation. The data is not stored and must be requested each time.

Existing systems cannot provide the necessary information to diagnose many wireless problems. When a device is roaming, either internationally or domestically, the network is not able to read the SIM card. Additionally, general service issues cannot be determined by existing systems. What is needed is a platform to remotely read a SIM card which stores responses from the SIM card.

SUMMARY OF THE INVENTION

The present invention is a system for gathering a plurality of data from a SIM card on a wireless communications device and recording the plurality of data onto a database where the plurality of data can be viewed at a later time. A network device requests a plurality of data from a SIM card on a wireless communications device. An OTA platform receives the request and gathers the plurality of data from the SIM card. The OTA platform, which normally sends the plurality of data back to the network device, sends the plurality of data to a file upload server instead. The file upload server records the plurality of data to a database where it can be viewed by the network device. In exemplary embodiments of the present invention, the file upload server sends a notification to the network device that the plurality of data is ready for viewing. In other exemplary embodiments, the plurality of data can be viewed from any internet portal.

In one exemplary embodiment, the present invention is a system for gathering information from a SIM card of a wireless communications device. The system includes a network device, an OTA platform in communication with the network device, a wireless communications device having a SIM card in communication with the OTA platform, a plurality of data on the SIM card, a file upload server in communication with the OTA platform, and a database in communication with the file upload server. The network device sends a request for a plurality of data to the OTA platform and receives the plurality of data from the database.

In another exemplary embodiment, the present invention is a method of viewing a plurality of data from a SIM card of a wireless communications device at a time later than a request for the plurality of data is sent. The method includes recording the plurality of data to a database from a file upload server, and viewing the plurality of data from the database. An OTA platform encrypts the request so that the wireless communications device understands and, once the OTA platform has received the plurality of data from the wireless communications device, sends the plurality of data to the file upload server.

In yet another exemplary embodiment, the present invention is a method of gathering information from a SIM card of a wireless communications device. The method includes sending a request for a plurality of data, encrypting the request so that a wireless communications device understands the request, sending the plurality of data to a file upload server, and recording the plurality of data onto a database. The plurality of data can be viewed at a time later than it is recorded.

DETAILED DESCRIPTION OF THE INVENTION

The present invention is a system for gathering a plurality of data from a SIM card on a wireless communications device and recording the plurality of data onto a database where the plurality of data can be viewed at a later time. A network device requests a plurality of data from a SIM card on a wireless communications device. An OTA platform receives the request and gathers the plurality of data from the SIM card. The OTA platform, which normally sends the plurality of data back to the network device, sends the plurality of data to a file upload server instead. The file upload server records the plurality of data to a database where it can be viewed by the network device. In exemplary embodiments of the present invention, the file upload server sends a notification to the network device that the plurality of data is ready for viewing. In other exemplary embodiments, the plurality of data can be viewed from any internet portal.

"Wireless communications device," as used herein and throughout this disclosure, refers to any device capable of sending or receiving waves to communicate with other devices. Examples of wireless communications devices are cellular telephones, computers, personal digital assistants (PDAs), or any other device that utilizes at least one form of wireless communication. Forms of wireless communication include cellular RF, BLUETOOTH, WiFi, etc.

"Network device," as used herein and throughout this disclosure, refers to any device capable of digital communication across a network. Examples of a network device include a personal computer, a cellular telephone, a PDA, etc.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Instead of transient data being stored in a browser on a network device, the command to read a plurality of data from a SIM card of a wireless communications device is sent to a file upload server. The file upload server receives the plurality of data, records the plurality of data into a database, and then notifies the requestor when the plurality of data is stored. The requestor can go in and view the plurality of data at their convenience because the plurality of data is stored persistently.

This solution utilizes a file upload server that receives the plurality of data asynchronously and records the plurality of data into a database. This is an improvement in two areas. First, the requestor's network device is not tied-up while waiting for the plurality of data to be received. The requestor can browse to other sites or continue with other tasks without fear of the plurality of data being lost. Second, the data is stored persistently in a database for subsequent retrieval and analysis.

Figure 1:
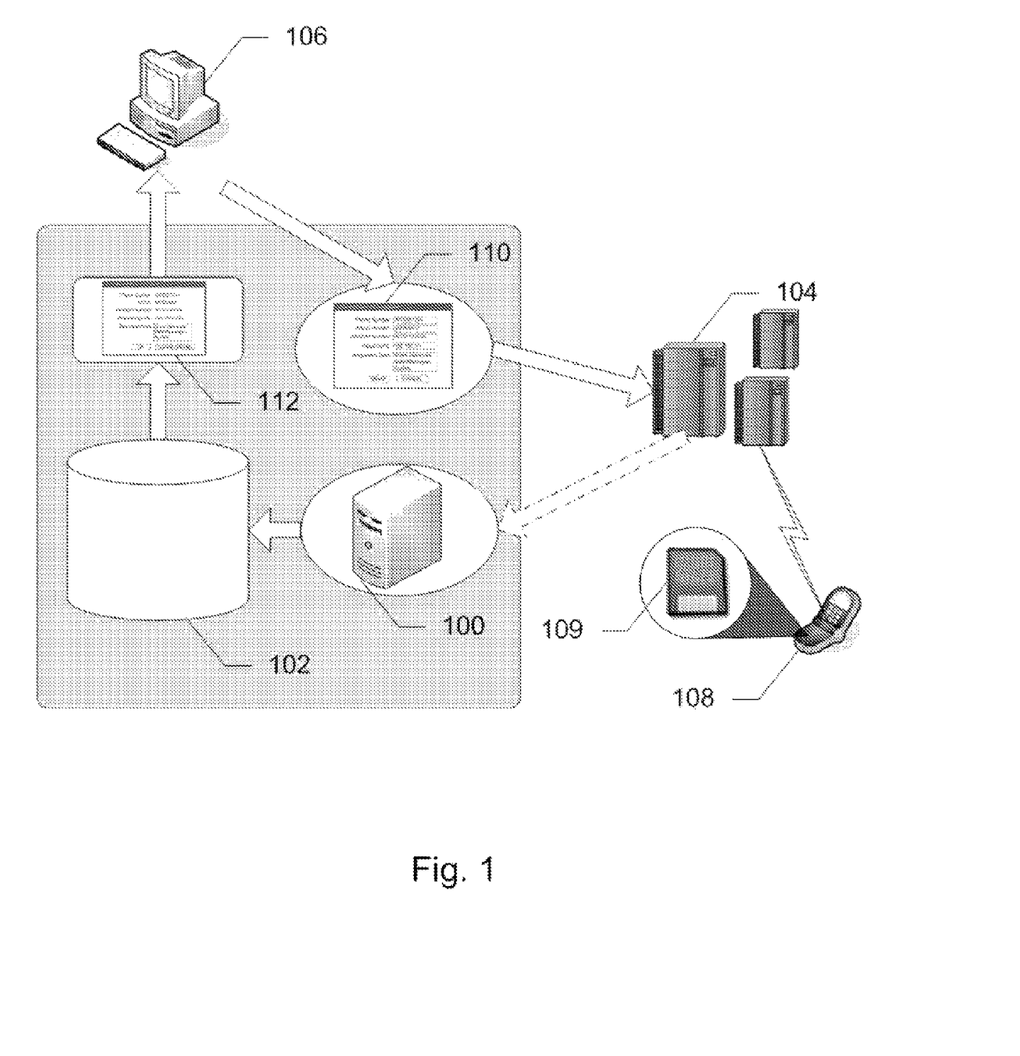
FIG. 1 shows a system for remotely reading a SIM card, according to an exemplary embodiment of the present invention.

FIG. 1 shows a system for remotely reading a SIM card 109, according to an exemplary embodiment of the present invention. In this embodiment, the system includes a network device 106, a request for a plurality of data 110, an OTA platform 104, a database 102, a file upload server 100, a plurality of data 112, a wireless communications device 108, and SIM card 109 onboard wireless communications device 108. When a user wishes to remotely read SIM card 109 on wireless communications device 108, the user uses a browser on the network device 106. The browser works with an application programming interface (API) onboard network device 106 to submit request 110. The API onboard network device 106 allows network device 106 to communicate with the OTA platform 104. Network device 106 communicates request 110 to OTA platform 104 over the network. OTA platform 104 allows a service provider to read and write data to and from SIM card 109 onboard wireless communications device 108. OTA platform 104 encrypts and sends request 110 to wireless communications device 108. Wireless communications device 108 reads SIM card 109 and relays plurality of data 112 from SIM card 109 back to OTA platform 104. OTA platform 104 translates then sends plurality of data 112 to file upload server 100 which records plurality of data 112 into database 102. The requestor queries database 102 over the network to receive plurality of data 112 from SIM card 109 of wireless communications device 108.

In other exemplary embodiments of the system the network device 106 may be a computer, a PDA, etc. The wireless communications device 108 can be a cellular telephone, a PDA, or any other device capable of wireless communication. The SIM card 109 is a common form of memory storage for cellular telephones especially on a GSM or UMTS standard. A SIM card 109 stores network specific information used to authenticate and identify subscribers on a network. This information includes the Integrated Circuit Card Identification (ICCID), International Mobile Subscriber Identity (IMSI), Authentication Key (Ki), Local Area Identity (LAI), and Operator-Specific Emergency Number. The SIM card 109 is a removable memory, but exemplary embodiments do not require the memory to be removable. Many other wireless communications devices having internal memory are within the scope of the present invention. The network device 106 may use a web browser to send the request 110.

The OTA platform 104 is responsible for formatting and encrypting the request 110 to the wireless communications device 108. The OTA platform 104 manages the content communication for the SIM card 109, which is a secure process that requires a specific key. Each SIM card 109 has a set of keys. The OTA platform 104 receives the request 110 from the network device 106, formats the request 110, and encrypts the request 110 so that the wireless communications device 108 understands the request 110. The wireless communications device 108 then receives the request 110, reads the plurality of data requested, and sends the plurality of data 112 back to the OTA platform 104. Then the OTA platform 104 sends the plurality of data 112 back through an API call to the file upload server 100. The file upload server 100 can be a basic PHP process that receives the plurality of data 112, decodes the plurality of data 112, and records the plurality of data 112 into a database 102.

The wireless communications device 108 communicates with the OTA platform 104 over a wireless network. The other components communicate with each other on a wired or wireless network. The network can be a closed network or a wide area network such as the INTERNET. Regardless of the network type, the process of requesting and receiving the plurality of data 112 is generally the same.

Figure 2:
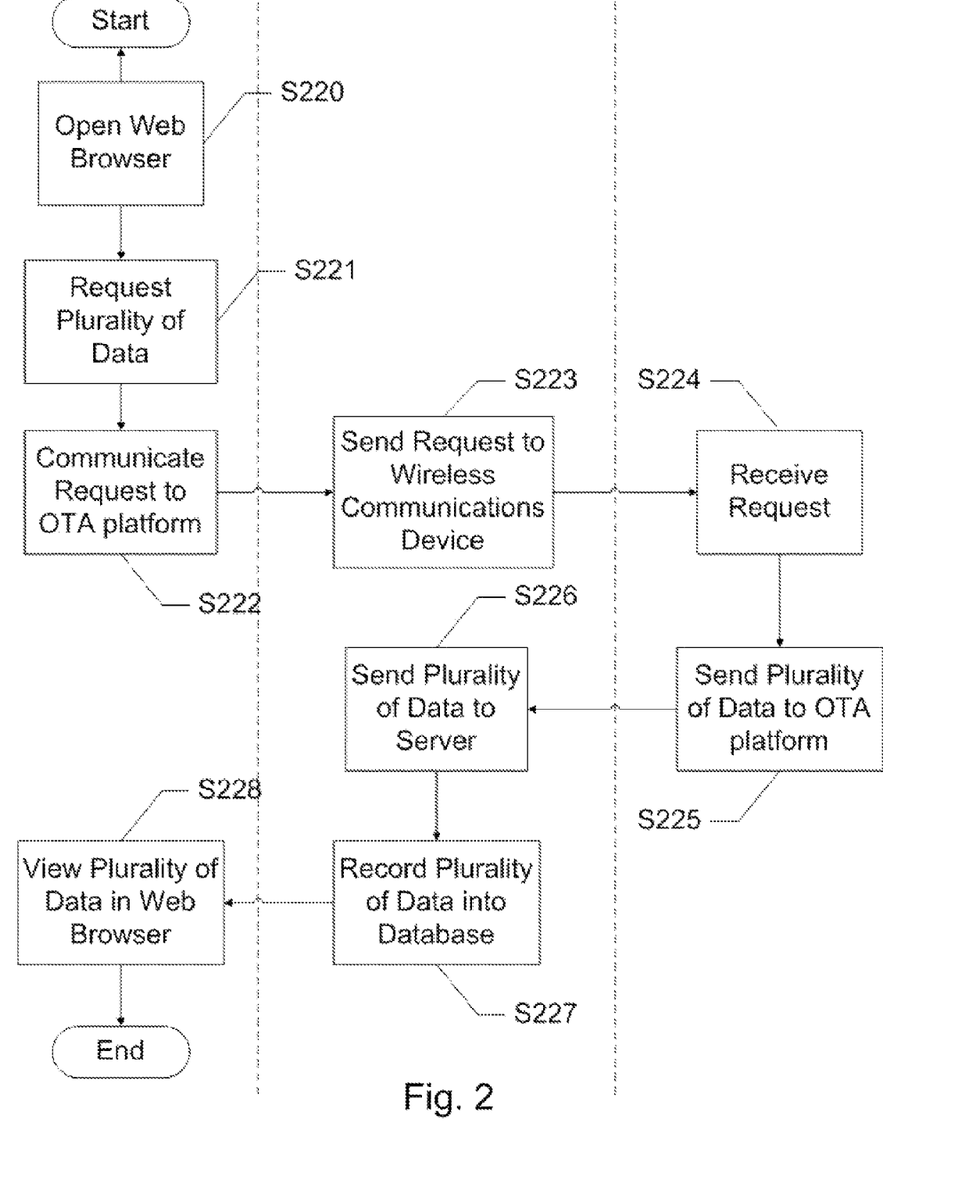
FIG. 2 shows a flowchart of a method of remotely reading a SIM card on a wireless communications device, according to an exemplary embodiment of the present invention.

FIG. 2 shows a flowchart of a method of remotely reading a SIM card 109 on a wireless communications device 108, according to an exemplary embodiment of the present invention. In this embodiment, a requestor opens a web browser S220. The user browses to a secure website and requests a plurality of data 112 from a specific SIM card, such as the SIM card 109, S221. This is accomplished by entering the phone's identification, the user's identification, and any other credentials necessary for security. The data request, such as the request 110, is communicated to an OTA platform 104 S222. The OTA platform 104 can encrypt and send requests, such as the request 110, to and receive and decrypt data from wireless communications devices, such as the wireless communication device 108. The OTA platform 104 sends the request 110 to the wireless communications device 108 S223. The wireless device 108 receives the request 110 and reads the plurality of data 112 on the SIM card 109 S224. The wireless device 108 then sends the plurality of data 112 to the OTA platform 104 S225. The OTA platform 104 receives the plurality of data 112 and sends the plurality of data 112 to a file upload server 100 S226. The file upload server 100 records the plurality of data 112 into a database 102 S227. The database 102 persistently stores the plurality of data 112 and allows the requestor to view the plurality of 112 at a later time. The user views the plurality of data 112 in the web browser when desired S228.

Although it uses a web browser, the network device 106 does not necessarily require an INTERNET connection, but a network connection, wired or wireless, to the OTA platform 104 and the file upload server 100. SIM cards, such as the SIM card 109, as a form of memory on a wireless communications device 108, have levels of encryption to avoid unwanted access over its wireless connection. However, other forms of memory may exist on wireless communications devices, such as the wireless communication device 108, that do not have the need for encryption. These and other forms of memory are readily recognizable to one skilled in the art and are within the scope of the present invention. In other exemplary embodiments of the present invention, the file upload server 100 sends a notice to the network device 106 notifying the requestor once the plurality of data 112 has been recorded to the database 102.

The request 110 for a plurality of data is submitted to the OTA platform 104 via a Simple Object Access Protocol (SOAP) API service. It is in this respect that the API to the OTA platform 104 is based on SOAP. Hypertext Transfer Protocol (HTTP) is the transport in this method. However, other transfer protocols may be used and are readily known to one of ordinary skill in the art. The OTA platform 104 handles the request 110 and returns the plurality of data 112 to a designated Uniform Resource Locator (URL) submitted in the request 110. The URL is the address of a server which will receive the request 110 and write the response to a database, such as the database 102. At this URL is a file upload server 104 utilizing a PHP process that parses the plurality of data 112 and records the plurality of data 112 into a database 102.

Because the request 110 is submitted to the API and the plurality of data 112 is handled asynchronously, the user is free to pursue other tasks with the web browser without opening multiple instances. Each instance consumes resources on the network device 106 and the OTA platform 104. This approach also reduces the risk of potential browser refresh issues that may cause the plurality of data 112 to be lost or to require re-submittal of the request 110. Also, since the request 110 is submitted to the API directly and by-passes the network device 106, the network device 106 is freed up for other tasks or not even required at all. The solution also allows for the user to historically view the plurality of data 112 in a database 102 after the request 110 has been processed. This is valuable in troubleshooting or testing scenarios where multiple requests 110 are submitted. The user can always view the information, such as the plurality of data 112, from the database 102 without recording the information using other methods which are open for error.

In a further exemplary embodiment, the file upload server 100 makes a duplicate request for a plurality of data from a SIM card 109 of a wireless communications device 108 at a later time. The file upload server 100 sends the request to an OTA platform 104 via a SOAP API service. The OTA platform 104 handles the request and returns the plurality of data to a designated URL submitted in the original request. At this URL is the file upload server 104 utilizing a PHP process that parses the plurality of data and records the plurality of data into a database 102. In this embodiment, the requester can view the plurality of data 112 at a time later than the original request 110, and also view the plurality of data from the duplicate request. No matter when the requester views the plurality of data 112, the requestor knows the plurality of data 112 is recent.

Whether the requester utilizes a web browser or another application built with the API, a request for a plurality of data 110 requires similar elements. These elements include some identifying number or code specific to the wireless communications device 108, and a return URL to which the OTA platform 104 sends the plurality of data 112 once the plurality of data 112 has been received from the wireless communications device 108.

Figure 3A:
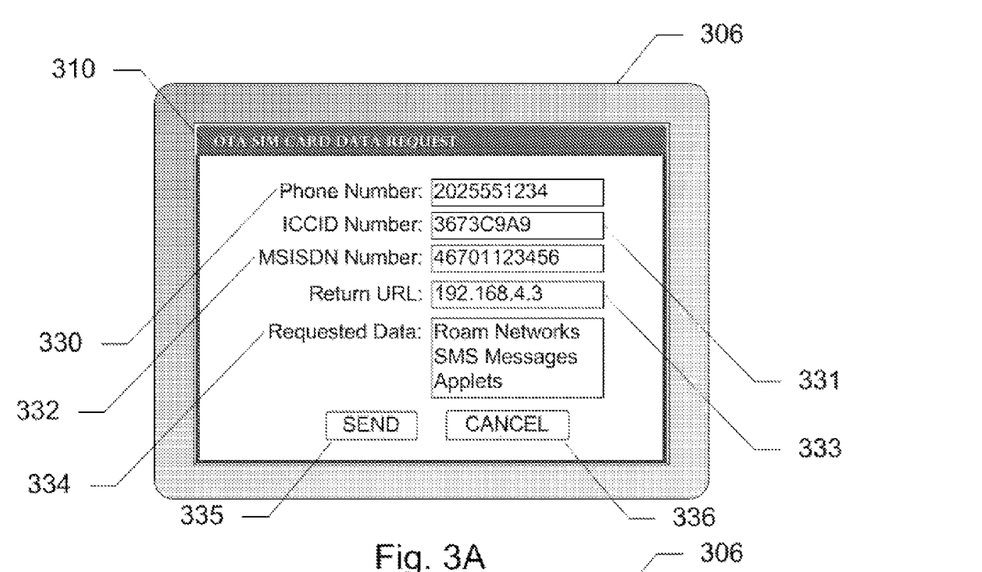
FIG. 3A shows a screenshot of a request for a plurality of data on a network device, according to an exemplary embodiment of the present invention.

FIG. 3A shows a screenshot of a request for a plurality of data 310 on a network device 306, according to an exemplary embodiment of the present invention. In this embodiment, the request includes a phone number entry 330, an integrated circuit card ID (ICCID) entry 331, a MSISDN entry 332, a return URL entry 333, a requested data entry 334, a send button 335, and a cancel button 336. The entry fields allow a user to enter known information concerning the SIM card to request data from the SIM card. Phone number entry 330 allows the user to enter the phone number of a wireless communications device associated with the SIM card to request data. ICCID entry 331 allows the user to enter the ICCID of the SIM card to request data. MSISDN entry 332 allows the user to enter the MSISDN to request data. Any one of the wireless communications device identifications, including phone number entry 330, ICCID entry 331, and MSISDN entry 332, can be used to identify the specific wireless communications device. Return URL entry 333 informs an OTA platform where to send data received from the wireless communications device. Requested data entry 334 allows the user to scroll through and select the data or type of data the user wishes to receive from the SIM card. After the user has entered at least one of the wireless communications device identifications, a return URL, and a data requested, the user presses or selects send button 335 to send the request. To cancel the request, the user presses or selects cancel button 336.

There are many other unique identifiers of wireless communications devices which are readily recognizable by one skilled in the art. In other exemplary embodiments, any of these unique identifiers can be used as well. The data and types of data that can be read from a SIM card of a wireless communications device are virtually limitless and can be requested from the SIM card in the same manner. These types of data include a network roaming list, an applet, an SMS message, etc. In exemplary embodiments where duplicate requests are to be made from the file upload server, an entry field with a time and count are included in a request.

Once the request is forwarded to the wireless communications device from the OTA platform, the plurality of data is returned. The plurality of data takes different forms as it travels to the database. The OTA platform must decrypt the plurality of data before sending it to the file upload server. Once the file upload server records the plurality of data to the database, the network device is ready to view the plurality of data. The plurality of data, though decrypted, is not always usable before being applied to a formula or program. In some embodiments the requestor is shown a selection screen where the plurality of data can be saved for processing or viewing.

Figure 3B:
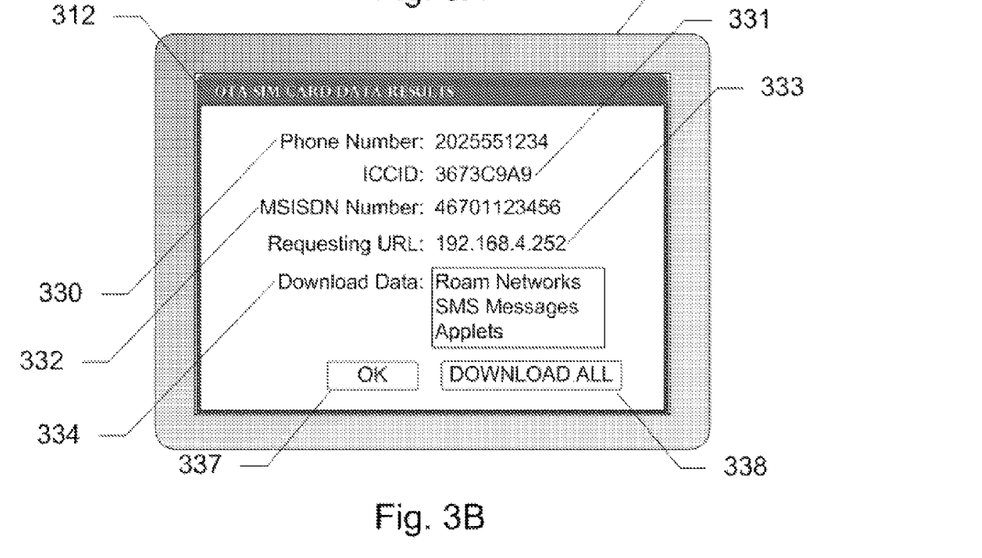
FIG. 3B shows a screenshot of a data selection screen on a network device, according to an exemplary embodiment of the present invention.

FIG. 3B shows a screenshot of a data selection screen 312 on a network device 306, according to an exemplary embodiment of the present invention. In this embodiment, the plurality of data includes a phone number 330, an ICCID 331, a MSISDN 332, a requesting URL 333, download data 334, an OK button 337, and a download all button 338. Phone number 330 lists the telephone number associated with wireless communications device on which the plurality of data resides. ICCID 331 lists the specific ID of the SIM card of the wireless communications device. MSISDN 332 lists the MSISDN number of the wireless communications device. Requesting URL 333 lists the URL of the location which requested the plurality of data. Download data 334 allows the user to select which data the user wishes to download from a file server to network device 306. The user scrolls through download data 334 and selects the appropriate data. To download the selected data, the user selects or presses OK button 337. To download all of the available data, the user selects or presses download all button 338.

On other exemplary embodiments, the plurality of data can be viewed before making a selection of which data to view. When viewed in this manner, the data can be saved directly from the screen of the network device. For embodiments where the file upload server makes duplicate requests, the results screen contains a refresh button. Upon pressing or selecting the refresh button, the network device checks the database for more recent results than what is displayed.

In another exemplary embodiment, the network device does not view the plurality of data directly from the database, but communicates with the file upload server before gaining access to the database. Access to the plurality of data may be more secure in this manner. The database does not require the complexity in this embodiment, and can be nothing more than simply a hard drive onboard the file upload server.

Figure 4:
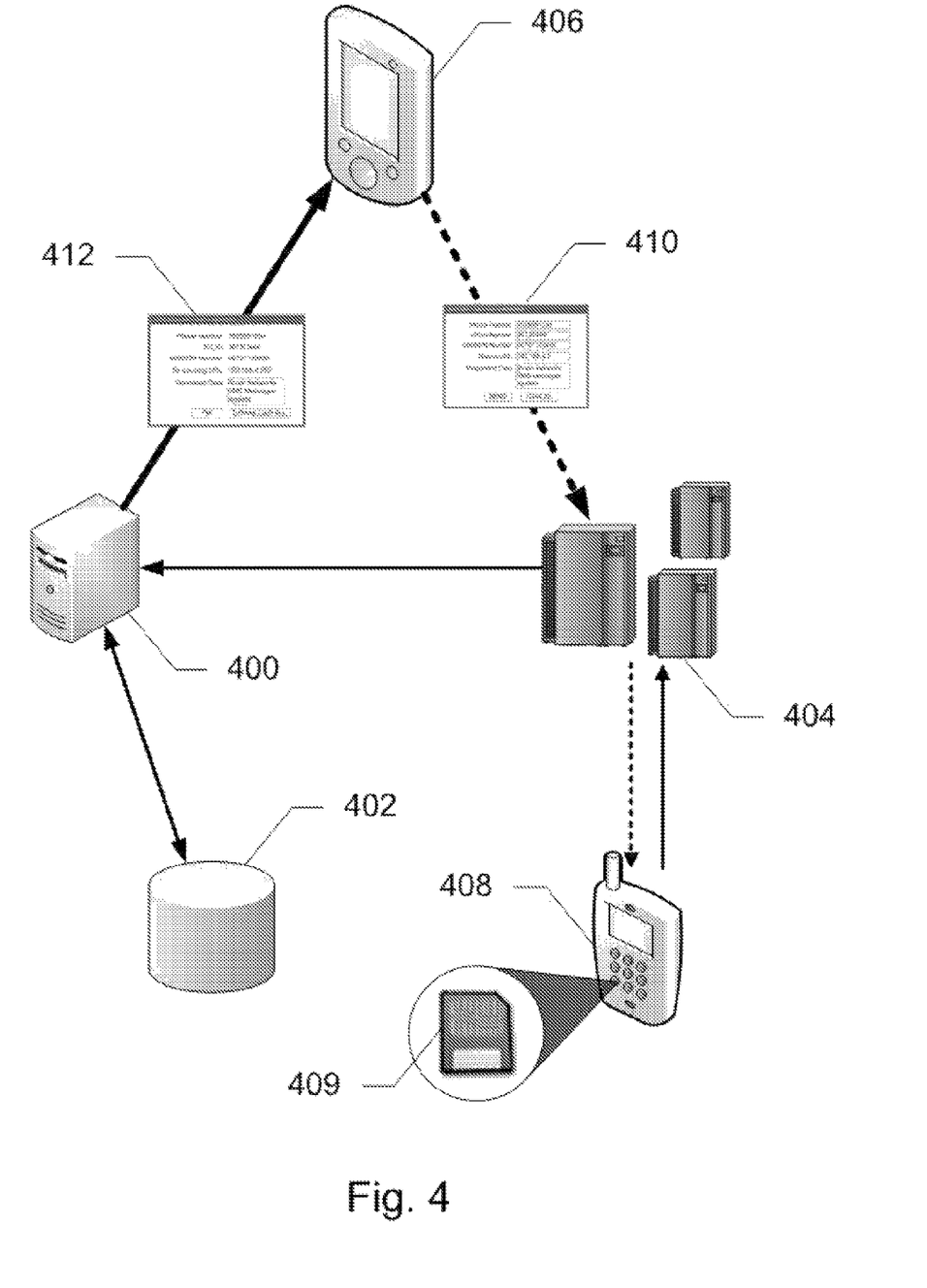
FIG. 4 shows a system for remotely reading a SIM card on a wireless communications device, according to an exemplary embodiment of the present invention.

FIG. 4 shows a system for remotely reading a SIM card 409 on a wireless communications device 408, according to an exemplary embodiment of the present invention. In this embodiment, the system includes a network device 406, a request for a plurality of data 410, an OTA platform 404, a file upload server 400, a database 402, a plurality of data 412, a wireless communications device 408, and a SIM card 409 onboard wireless communications device 408. Network device 406 sends request 410 to OTA platform 404 through a network. Request 410 includes an identification of wireless communications device 408 as well as the plurality of data 412 that is being requested. OTA platform 404 is capable of wirelessly sending and retrieving data from SIM card 409 on wireless communications device 408. OTA platform 404 receives request 410 from network device 406, encrypts, and forwards request 410 to wireless communications device 408. Wireless communications device 408 reads SIM card 409 to determine the desired data, such as the plurality of data 412. Wireless communications device 408 then sends plurality of data 412 back to OTA platform 404. OTA platform 404 receives plurality of data 412, decrypts, and sends plurality of data 412 to file upload server 400. File upload server 400 records plurality of data 412 into database 402 where the plurality of data 412 can be accessed at a later time. Network device 406 can upload data 412 from database 402 through file upload server 400 when the user desires.

Network device 406 may be a cellular telephone, a PDA, or any device capable of wireless communication. In other exemplary embodiments, the file upload server 400 notifies the network device 406 of the availability of the plurality of data 412 recorded into the database 402.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system, comprising:
an over the air server including a processor; and
a memory coupled to the processor and storing instructions that, when executed by the processor, cause the processor to perform instructions comprising:
receiving a first request from a network device for remotely reading a plurality of data stored on a subscriber identification module of a wireless communications device, the first request including a designated uniform resource locator for receiving the plurality of data at a file upload server,
transmitting the plurality of data to the designated uniform resource locator at the file upload server, wherein the file upload server utilizes a PHP process to decode the plurality of data and record the plurality of data onto a database upon receiving the plurality of data from the over the air server asynchronously,
subsequently receiving a duplicate request from the file upload server, the duplicate request including an entry field with a time and a count, and
transmitting an updated plurality of data to the designated uniform resource locator of the file upload server,
wherein the network device receives a notification from the file upload server that the plurality of data is ready for viewing.

2. The system in claim 1, wherein the network device is at least one of a personal computer, a personal digital assistant, or a cellular telephone.

3. The system in claim 1, wherein the plurality of data includes at least one of a network roaming list, an applet, or a short messaging service message.

4. The system in claim 1, wherein the over the air server communicates with the network device over at least one of a cellular network, a WiFi network, a BLUETOOTH network, or a wired network.

5. The system in claim 1, wherein the over the air server communicates with the wireless communications device over a cellular network.

6. The system in claim 1, wherein the over the air server communicates with the file upload server over at least one of a cellular network, a WiFi network, a BLUETOOTH network, or a wired network.

7. A method, comprising:
receiving, by an over the air server comprising a processor, a first request from a network device for remotely reading a plurality of data stored on a subscriber identification module of a wireless communications device, the first request including a designated uniform resource locator for receiving the plurality of data at a file upload server;
transmitting, by the processor, the plurality of data to the designated uniform resource locator at the file upload server, wherein the file upload server utilizes a PHP process to decode the plurality of data and record the plurality of data onto a database upon receiving the plurality of data from the over the air server asynchronously;
subsequently receiving, by the processor, a duplicate request from the file upload server, the duplicate request including an entry field with a time and a count; and
transmitting, by the processor, an updated plurality of data to the designated uniform resource locator of the file upload server;
wherein the network device receives a notification from the file upload server that the plurality of data is ready for viewing.

8. The method in claim 7, further comprising accessing the database over a web browser.

9. The method in claim 8, wherein the accessing over the web browser further comprises connecting to the file upload server.

10. The method in claim 7, wherein the network device views the plurality of data by communicating with the file upload server.

11. A method, comprising:
decoding, by a server comprising a processor, a plurality of data using a PHP process, the plurality of data being received asynchronously from an over the air platform at the server, the plurality of data being read by the over the air platform from a subscriber identification module card of a wireless communications device in response to the over the air platform receiving a first request from a network device for remotely reading the plurality of data, the first request including a designated uniform resource locator for receiving the plurality of data;
recording, processor, the plurality of data onto a database upon the decoding of the plurality of data;
subsequently submitting, by the processor, a duplicate request to the over the air platform, the duplicate request including an entry field with a time and a count; and
receiving, by the processor, an updated plurality of data from the over the air platform;
wherein the over the air platform receives the first request for the plurality of data from an application programming interface of the network device; and
wherein the processor notifies the network device that the plurality of data is available for viewing.

12. The method in claim 11, further comprising decrypting the plurality of data.

13. The method in claim 11, further comprising presenting the updated plurality of data to the network device.

14. The method in claim 13, wherein the presenting further comprises presenting the plurality of data through a web browser on the network device.

15. The method in claim 11, wherein the over the air platform communicates with the wireless communications device over a wireless network.

16. The method in claim 11, wherein the first request for the plurality of data is submitted to the over the air platform via a simple object access protocol.

17. The method of claim 11, wherein the over the air platform encrypts the first request upon receiving the first request.

18. The method of claim 11, wherein the network device sends the first request for the plurality of data using a web browser.

* * * * *

UNITED STATES PATENT AND TRADEMARK OFFICE
CERTIFICATE OF CORRECTION

PATENT NO. : 8,781,530 B2  
APPLICATION NO. : 12/336523  
DATED : July 15, 2014  
INVENTOR(S) : Scott Inlow Page 1 of 1

It is certified that error appears in the above-identified patent and that said Letters Patent is hereby corrected as shown below:

Item (73) on the title page of the patent should be amended as follows:

AT&T Mobility II LLC, Atlanta, GA (US)

In the claims

Col. 8, lines 38-40 Claim 1 should be amended as follows:

a memory coupled to the processor and storing instructions that, when executed by the processor, cause the processor to perform operations comprising:

Signed and Sealed this  
Ninth Day of August, 2016

Michelle K. Lee  
*Director of the United States Patent and Trademark Office*